United States Patent
Chang et al.

(10) Patent No.: US 12,468,129 B2
(45) Date of Patent: Nov. 11, 2025

(54) LENS ASSEMBLY

(71) Applicants: Sintai Optical (Shenzhen) Co., Ltd., Guandong (CN); Asia Optical Co., Inc., Taichung (TW)

(72) Inventors: Hsi-Ling Chang, Taichung (TW); Chien-Hung Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 18/971,558

(22) Filed: Dec. 6, 2024

(65) Prior Publication Data

US 2025/0102776 A1  Mar. 27, 2025

Related U.S. Application Data

(63) Continuation of application No. 18/325,218, filed on May 30, 2023.

(30) Foreign Application Priority Data

Jul. 14, 2022  (TW) .................................. 111126435
Apr. 27, 2023  (CN) .......................... 202310466375.6

(51) Int. Cl.
G02B 13/00   (2006.01)
G02B 9/12    (2006.01)

(52) U.S. Cl.
CPC ........... G02B 13/0065 (2013.01); G02B 9/12 (2013.01); G02B 13/0035 (2013.01)

(58) Field of Classification Search
CPC ... G02B 13/0065; G02B 9/12; G02B 13/0035
See application file for complete search history.

(56) References Cited

U.S. PATENT DOCUMENTS

2006/0017834 A1 * 1/2006 Konno ............... G02B 13/0065
                                                    348/335
2022/0163706 A1 * 5/2022 Feldman ............ G02B 13/0065
(Continued)

FOREIGN PATENT DOCUMENTS

CN  111856711 A * 10/2020
CN  111866328 A * 10/2020 .......... H04M 1/0264
(Continued)

OTHER PUBLICATIONS

Mansurov ("What is Field Curvature", Dec. 10, 2019, Par 1, https://photographylife.com/what-is-field-curvature). (Year: 2019).*

Primary Examiner — Balram T Parbadia
Assistant Examiner — Ray Alexander Dean
(74) Attorney, Agent, or Firm — McClure, Qualey & Rodack, LLP

(57) ABSTRACT

A lens assembly includes a lens unit and a first reflective element. The lens unit includes a plurality of lenses and the back focal length of the lens unit is longer than the total length of the lens unit. The first reflective element includes a first surface, a first prism surface, and a bottom surface, and the first prism surface connects the first surface and the bottom surface, respectively. The lens unit and the first reflective element are arranged in order from an object side along a first axis. A light from the object side enters the first reflective element from the first surface and then is guided to the first prism surface.

19 Claims, 14 Drawing Sheets

(56) References Cited

U.S. PATENT DOCUMENTS

| | | | |
|---|---|---|---|
| 2022/0196987 | A1 | 6/2022 | Zhang et al. |
| 2022/0357567 | A1 | 11/2022 | Zhao et al. |

FOREIGN PATENT DOCUMENTS

| | | | | |
|---|---|---|---|---|
| CN | 115103045 | A | * | 9/2022 |
| CN | 115103045 | A1 | | 9/2022 |
| CN | 218272884 | U | | 1/2023 |
| CN | 219370036 | U | | 7/2023 |
| CN | 117270292 | A | | 12/2023 |
| CN | 117452603 | A | | 1/2024 |
| CN | 117518404 | A | | 2/2024 |
| CN | 117590557 | A | | 2/2024 |
| CN | 117590558 | A | | 2/2024 |
| CN | 118068633 | A | | 5/2024 |
| CN | 117608055 | B | | 6/2024 |
| CN | 118330848 | A | | 7/2024 |
| CN | 118330968 | A | | 7/2024 |
| CN | 118363147 | A | | 7/2024 |
| CN | 118450233 | A | | 8/2024 |
| CN | 118642252 | A | | 9/2024 |
| CN | 118678222 | A | | 9/2024 |
| CN | 118842985 | A | | 10/2024 |

\* cited by examiner

LENS ASSEMBLY

CROSS REFERENCE TO RELATED APPLICATIONS

This application is a Continuation of pending U.S. patent application Ser. No. 18/325,218, filed May 30, 2023 and entitled "LENS ASSEMBLY", which claims the right of priority under 35 U.S.C. § 119 of Taiwan Patent Application TW111126435 filed on Jul. 14, 2022 and China Patent Application CN202310466375.6 filed on Apr. 27, 2023 (the right of priority of the Taiwan Patent Application TW111126435 was claimed when the China Patent Application CN202310466375.6 was filed with the China National Intellectual Property Administration, CNIPA), each of which is incorporated by reference herein in its entirety.

BACKGROUND OF THE INVENTION

Field of the Invention

The invention relates to a lens assembly.

Description of the Related Art

The current development trend of a portable device is toward slim and lightweight. In addition to high resolution requirement, the lens assembly used in portable device needs to continuously shorten the total length and decrease the volume in order to meet the requirements of slim and lightweight. However, the known lens assembly can't satisfy such requirements. Therefore, the lens assembly needs a new structure in order to meet the requirements of high resolution, miniaturization, and small size at the same time.

BRIEF SUMMARY OF THE INVENTION

The invention provides a lens assembly to solve the above problems. The lens assembly of the invention is provided with characteristics of a decreased total lens length, a decreased volume, an increased resolution, and still has a good optical performance. Specifically, the lens assembly of the present invention has the following benefits: setting reflective element to reflect the light at least three times inside the reflective element, so that the light has a longer optical path inside the reflective element; enabling to set a long focus lens with a longer effective focal length (EFL) and a longer back focal length (BFL) in the limited space for the lens assembly and effectively improving the space utilization efficiency; and achieving the slim format and having good optical performance to meet the image quality requirement. In other words, the quality requirement of the lens assembly can be achieved in a limited space.

The lens assembly in accordance with an exemplary embodiment of the invention includes a lens unit and a first reflective element. The lens unit includes a plurality of lenses and the back focal length of the lens unit is longer than the total length of the lens unit. The first reflective element includes a first surface, a first prism surface, and a bottom surface, and the first prism surface connects the first surface and the bottom surface, respectively. The lens unit and the first reflective element are arranged in order from an object side along a first axis. A light from the object side enters the first reflective element from the first surface and then is guided to the first prism surface. The lens assembly satisfies at least one of the following conditions: $0.2 < Dm1/f < 0.7$; $0.5 < 1/\tan(\beta 1) < 2.5$; $0.15 < B/A < 0.6$; $0.15 < C/B < 1.0$; $0.1 < D/A < 0.55$; $1.0 < F/E < 3.0$; wherein $Dm1$ is an effective optical diameter of an image side surface of a lens and the lens is closest to the object side, f is an effective focal length of the lens assembly, $\beta 1$ is an angle value of the included angle between the first surface and the first prism surface, B is an interval from an object side surface of the lens to the first surface along the direction of the first axis, A is a maximum interval from a periphery of the effective optical diameter of the object side surface of the lens that is furthest away from an image plane to a periphery of the image plane that is furthest away from the lens along the direction perpendicular to the first axis, C is an interval from the first surface to the image plane along the direction of a second axis and the second axis is parallel to the first axis, D is a maximum interval from the first surface to the bottom surface along the direction of the first axis, F is a maximum interval from the object side surface of the lens to the bottom surface along the direction of the first axis, and E is a maximum interval from the bottom surface to the image plane along the direction of the second axis.

In another exemplary embodiment, the lens unit includes a first lens with refractive power and a second lens with refractive power, wherein the first lens and the second lens are arranged in order from the object side along the first axis; the first lens is with positive refractive power and includes a convex surface facing the object side along the first axis; and the second lens is a meniscus lens with negative refractive power and includes a convex surface facing the object side along the first axis and a concave surface facing the first reflective element along the first axis.

In yet another exemplary embodiment, the first lens is a meniscus lens and further includes a concave surface facing the first reflective element along the first axis.

In another exemplary embodiment, the lens assembly further includes a third lens disposed between the second lens and the first reflective element, wherein the third lens is a biconvex lens with positive refractive power and includes a convex surface facing the object side along the first axis and another convex surface facing the first reflective element along the first axis.

In yet another exemplary embodiment, the first lens is a biconvex lens and further includes a convex surface facing the first reflective element along the first axis.

In another exemplary embodiment, the lens assembly further includes a third lens disposed between the first lens and the second lens, wherein the third lens is a meniscus lens with positive refractive power and includes a convex surface facing the object side along the first axis and a concave surface facing the first reflective element along the first axis.

In yet another exemplary embodiment, the first reflective element further includes a second prism surface; and another angle value of the included angle between the first surface and the second prism surface is equal to the angle value of the included angle between the first surface and the first prism surface.

In another exemplary embodiment, the first reflective element further includes a second prism surface; and the first surface includes two sides and the two sides connect to one side of the first prism surface and one side of the second prism surface, respectively.

In yet another exemplary embodiment, the bottom surface includes two sides and the two sides connect to another side of the first prism surface and another side of the second prism surface, respectively.

In another exemplary embodiment, the first surface is opposite to the bottom surface.

In yet another exemplary embodiment, the angle value of the included angle between the first surface and the first prism surface is 29 degrees to 42 degrees.

In another exemplary embodiment, the light is reflected at least three times inside the first reflective element before exiting the first reflective element.

In yet another exemplary embodiment, the light enters the first prism surface and is reflected to the first surface, the first surface reflects the light and then enters the second prism surface, the second prism surface reflects the light and then enters the first surface, and the light exits the first reflective element from the first surface.

In another exemplary embodiment, the bottom surface or the first surface further includes a groove.

In yet another exemplary embodiment, the lens assembly satisfies the following condition: $0.1<G/D<0.6$; wherein G is a groove depth of the groove and D is a maximum interval from the first surface to the bottom surface along the direction of the first axis.

In another exemplary embodiment, the bottom surface further includes a groove and the lens assembly satisfies at least one of the following condition: $0<f1/f<2$; $0.15<R11/R21<3.5$; $0.6<f1/Dm1<2.8$; $5<f/T1<20$; wherein f1 is an effective focal length of the first lens, f is the effective focal length of the lens assembly, R11 is a radius of curvature of an object side surface of the first lens, R21 is a radius of curvature of an object side surface of the second lens, Dm1 is the effective optical diameter of the image side surface of the lens and the lens is closest to the object side, and T1 is an interval from the object side surface of the first lens to an image side surface of the first lens along the direction of the first axis.

In yet another exemplary embodiment, the lens assembly further includes a second reflective element disposed between the first reflective element and the image plane, wherein the material of the first reflective element is different to that of the second reflective element.

In another exemplary embodiment, the light enters the first prism surface and is reflected twice inside the first reflective element, then exiting the first reflective element and guided to the second reflective element, then reflected once inside the second reflective element and exiting the second reflective element.

In yet another exemplary embodiment, the lens assembly satisfies at least one of the following conditions: $1.4 \leq NdP1 \leq 1.9$; $1.5 \leq NdP2 \leq 2.0$; $0.1<|NdP1- NdP2|<0.5$; wherein NdP1 is a refractive index of the first reflective element and NdP2 is a refractive index of the second reflective element.

In another exemplary embodiment, the first reflective element is integrally formed, or the first reflective element are formed by two reflective elements with the same material, or the first reflective element can also be replaced by two reflective elements with different material.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
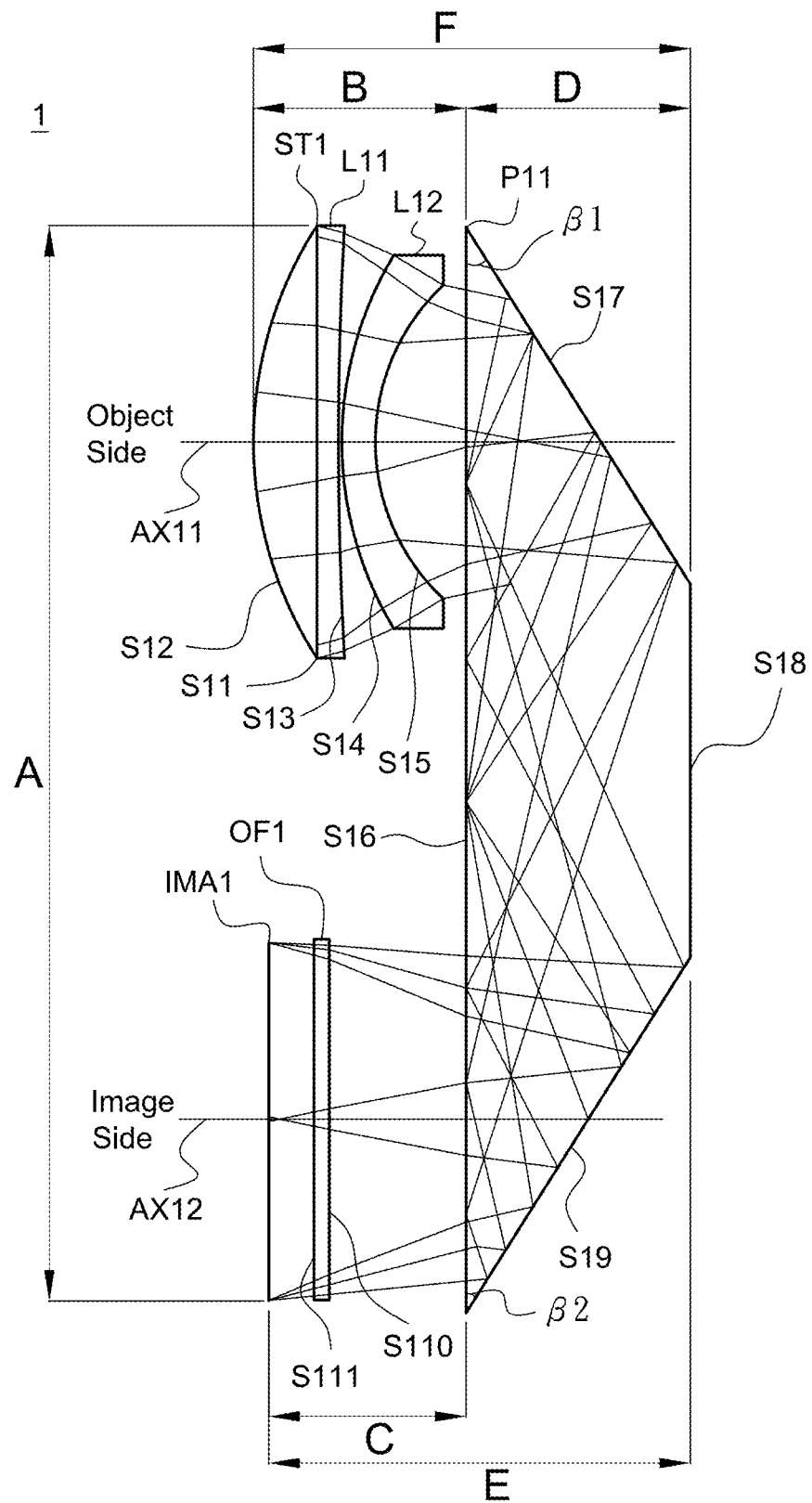
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a lens unit and a first reflective element. The lens unit includes a plurality of lenses and the back focal length of the lens unit is longer than the total length of the lens unit. The first reflective element includes a first surface, a first prism surface, and a bottom surface, and the first prism surface connects the first surface and the bottom surface, respectively. The lens unit and the first reflective element are arranged in order from an object side along a first axis. A light from the object side enters the first reflective element from the first surface and then is guided to the first prism surface. The lens assembly satisfies at least one of the following conditions: $0.2<Dm1/f<0.7$; $0.5<1/\tan(\beta1)<2.5$; $0.15<B/A<0.6$; $0.15<C/B<1.0$; $0.1<D/A<0.55$; $1.0<F/E<3.0$; wheren Dm1 is an effective optical diameter of an image side surface of a lens and the lens is closest to the object side, f is an effective focal length of the lens assembly, $\beta1$ is an angle value of the included angle between the first surface and the first prism surface, B is an interval from an object side surface of the lens to the first surface along the direction of the first axis, A is a maximum interval from a periphery of the effective optical diameter of the object side surface of the lens that is furthest away from an image plane to a periphery of the image plane that is furthest away from the lens along the direction perpendicular to the first axis, C is an interval from the first surface to the image plane along the direction of a second axis and the second axis is parallel to the first axis, D is a maximum interval from the first surface to the bottom surface along the direction of the first axis, F is a maximum interval from the object side surface of the lens to the bottom surface along the direction of the first axis, and E is a maximum interval from the bottom surface to the image plane along the direction of the second axis. The back focal length is referred to as BFL, is a total length of the optical path from an image side surface of a lens of the lens unit to the image plane along an axis and the lens is closest to the first reflective element. The total length of the lens unit is referred to as OL, is an interval from an object side surface of a lens of the lens unit to an image side surface of another lens of the lens unit along the direction of the first axis and the lens is closest to the object side and another lens is closest to the first reflective element. BFL is greater than OL. The basic function of the lens assembly of the present invention can be achieved when the lens assembly of the present invention satisfies the above features and conditions, and does not require other additional features or conditions.

Figure 5:
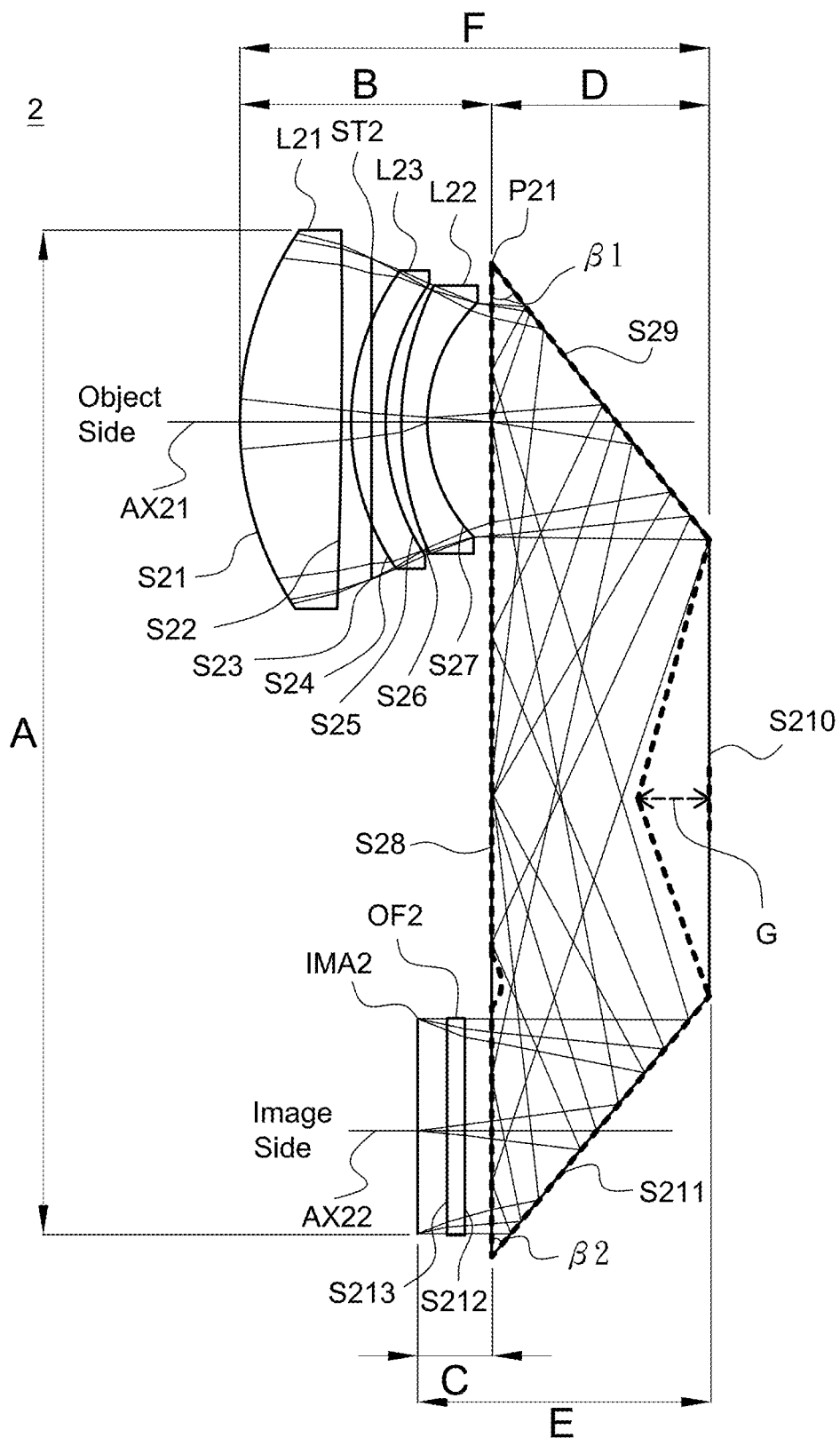
FIG. 5 is a lens layout and optical path diagram of a lens assembly in accordance with a second embodiment of the invention.
Figure 9:
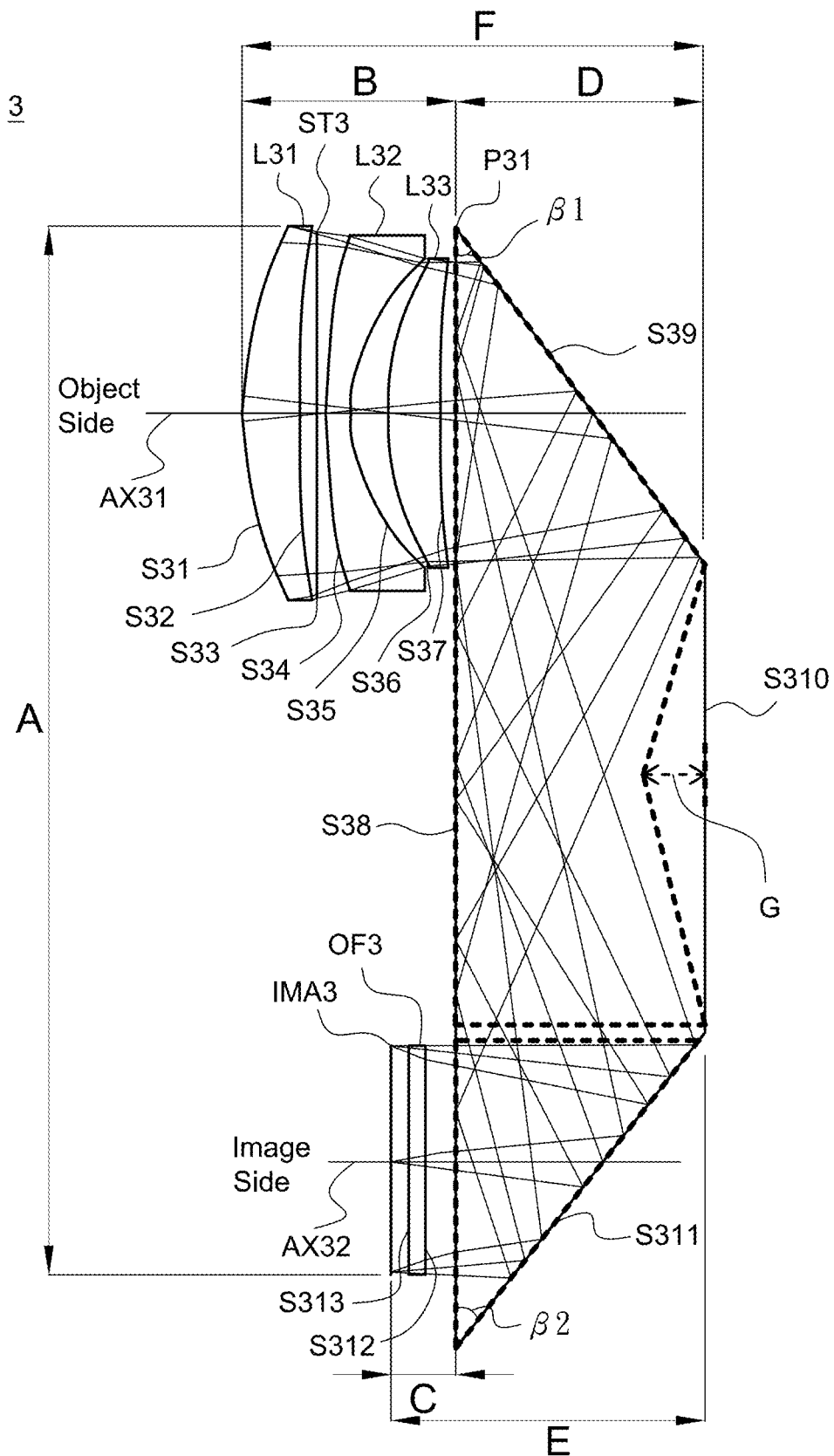
FIG. 9 is a lens layout and optical path diagram of a lens assembly in accordance with a third embodiment of the invention.

Referring to Table 1, Table 2, Table 4, Table 5, Table 7, and Table 8, wherein Table 1, Table 4, and Table 7 show optical specification in accordance with a first, second, and third embodiments of the invention, respectively, and Table 2, Table 5, and Table 8 show aspheric coefficients of each aspheric lens in Table 1, Table 4, and Table 7, respectively. FIG. 1, FIG. 5, and FIG. 9 are lens layout and optical path diagrams of a lens assembly in accordance with a first, second, and third embodiments of the invention, respectively. The first lenses L11, L21, L31 are with positive refractive power and made of glass material, wherein the object side surfaces S12, S21, S31 are convex surfaces and both of the object side surfaces S12, S21, S31 and image side surfaces S13, S22, S32 are aspheric surfaces.

The second lenses L12, L22, L32 are meniscus lenses with negative refractive power and made of glass material, wherein the object side surfaces S14, S26, S34 are convex surfaces, the image side surfaces S15, S27, S35 are concave surfaces, and both of the object side surfaces S14, S26, S34 and image side surfaces S15, S27, S35 are aspheric surfaces.

The first reflective elements P11, P21, P31 are prisms and made of glass or plastic material, wherein the first surfaces S16, S28, S38 are plane surfaces, the first prism surfaces S17, S29, S39 are plane surfaces, the bottom surfaces S18, S210, S310 are plane surfaces, and the second prism surfaces S19, S211, S311 are plane surfaces. With the configuration of the first reflective element, the total length of the lens assembly can be shortened, thereby decreasing the volume of the lens assembly and avoiding excessively occupying the limited space of the device equipped with the lens assembly.

In addition, the lens assemblies 1, 2, 3 satisfy at least one of the following conditions (1)-(11):

$$0.2 < Dm1/f < 0.7; \quad (1)$$
$$0.5 < 1/\tan(\beta1) < 2.5; \quad (2)$$
$$0.15 < B/A < 0.6; \quad (3)$$
$$0.1 < D/A < 0.55; \quad (4)$$
$$1.0 < F/E < 3.0; \quad (5)$$
$$0.15 < C/B < 1.0; \quad (6)$$
$$0 < f1/f < 2; \quad (7)$$
$$0.15 < R11/R21 < 3.5; \quad (8)$$
$$0.6 < f1/Dm1 < 2.8; \quad (9)$$
$$5 < f/T1 < 20; \quad (10)$$
$$0.1 < G/D < 0.6; \quad (11)$$

wherein Dm1 is an effective optical diameter of the image side surfaces S13, S22, S32 of the first lenses L11, L21, L31 for the first to third embodiments, that is, an effective optical diameter of the image side surfaces S13, S22, S32 of the lenses L11, L21, L31 closest to the object side, in other words, Dm1 is an effective optical diameter of the image side surfaces S13, S22, S32 of the lenses L11, L21, L31 counted number one from the object side; f is an effective focal length of the lens assemblies 1, 2, 3 for the first to third embodiments; β1 is an angle value of the included angle between the first surfaces S16, S28, S38 and the first prism surfaces S17, S29, S39 for the first to third embodiments; B is an interval from the object side surfaces S12, S21, S31 of the first lenses L11, L21, L31 to the first surfaces S16, S28, S38 along the direction of the first axes AX11, AX21, AX31 for the first to third embodiments, that is, an interval from the object side surfaces S12, S21, S31 of the lenses L11, L21, L31 closest to the object side to the first surfaces S16, S28, S38 along the direction of the first axes AX11, AX21, AX31 for the first to third embodiments; A is a maximum interval from a periphery of the effective optical diameter of the object side surfaces S12, S21, S31 of the first lenses L11, L21, L31 that is furthest away from an image plane IMA1, IMA2, IMA3 to a periphery of the image plane IMA1, IMA2, IMA3 that is furthest away from the first lenses L11, L21, L31 along the direction perpendicular to the first axes AX11, AX21, AX31 for the first to third embodiments, that is, A is a maximum interval from a periphery of the effective optical diameter of the object side surfaces S12, S21, S31 of the lenses L11, L21, L31 closest to the object side that is furthest away from an image plane IMA1, IMA2, IMA3 to a periphery of the image plane IMA1, IMA2, IMA3 that is furthest away from the first lenses L11,L21, L31 along the direction perpendicular to the first axes AX11, AX21, AX31; D is a maximum interval from the first surfaces S16, S28, S38 to the bottom surfaces S18, S210, S310 along the direction of the first axes AX11, AX21, AX31 for the first to third embodiments; F is a maximum interval from the object side surfaces S12, S21, S31 of the first lenses L11, L21, L31 to the bottom surfaces S18, S210, S310 along the direction of the first axes AX11, AX21, AX31 for the first to third embodiments, that is, F is the maximum interval from the object side surfaces S12, S21, S31 of the lenses L11, L21, L31 closest to the object side to the bottom surfaces S18, S210, S310 along the direction of the first axes AX11, AX21, AX31; E is a maximum interval from the bottom surfaces S18, S210, S310 to the image planes IMA1, IMA2, IMA3 along the direction of the second axes AX12, AX22, AX32 for the first to third embodiments; C is a maximum interval from the first surfaces S16, S28, S38 to the image planes IMA1, IMA2, IMA3 along the direction of the second axes AX12, AX22, AX32 for the first to third embodiments; G is a groove depth of the first reflective elements P11, P21, P31 for the first to third embodiments, that is, G is a maximum interval from the surface of the first reflective elements P11, P21, P31 to the inner pit of the first reflective elements P11, P21, P31; f1 is an effective focal length of the first lenses L11, L21, L31 for the first to third embodiments, that is, f1 is the effective focal length of the lenses L11, L21, L31 closest to the object side; R11 is a radius of curvature of the object side surfaces S12, S21, S31 of the first lenses L11, L21, L31 for the first to third embodiments, that is, R11 is the radius of curvature of the object side surfaces S12, S21, S31 of the lenses L11, L21, L31 closest to the object side; R21 is a radius of curvature of the object side surfaces S14, S26, S34 of the second lenses L12, L22, L32 for the first to third embodiments; and T1 is an interval from the object side surfaces S12, S21, S31 of the first lenses L11, L21, L31 to the image side surfaces S13, S22, S32 of the first lenses L11, L21, L31 along the direction of the first axes AX11, AX21, AX31 for the first to third embodiments, that is, T1 is an interval from the object side surfaces S12, S21, S31 of the lenses L11, L21, L31 closest to the object side to the image side surfaces S13, S22, S32 of the lenses L11, L21, L31 closest to the object side along the direction of the first axes AX11, AX21, AX31. With the lens assemblies 1, 2, 3 satisfying at least one of the above conditions (1)-(11), the total lens length can be effectively shortened, the volume can be effectively decreased, the resolution can be effectively increased, the aberration can be effectively corrected, the chromatic aberration can be effectively corrected, a high-end long focus lens with a longer effective focal length (EFL) and a longer back focal length (BFL) can be installed in the limited space for the lens assembly, the space utilization efficiency can be effectively increased, and slim format can be effectively achieved and has good optical performance.

When the condition (1): 0.2<Dm1/f<0.7; condition (2): 0.5<1/tan (β1)<2.5 are satisfied, the image quality can be effectively improved. When the condition (3): 0.15<B/A<0.6; condition (4): 0.1<D/A<0.55; condition (5): 1.0<F/E<3.0; condition (6): 0.15<C/B<1.0 are satisfied, the volume of the lens assembly can be effectively decreased and improve space utilization. When the condition (11): 0.1<G/D<0.6 is satisfied, the stray light can be effectively eliminated and decrease ghost image. When the condition (7): 0<f1/f<2; condition (8): 0.15<R11/R21<3.5; condition (9): 0.6<f1/Dm1<2.8; condition (10): 5<f/T1<20 are satisfied, the slim format for the lens assembly can be ensured and has better manufacturing yield to decrease manufacturing cost.

A detailed description of a lens assembly in accordance with a first embodiment of the invention is as follows. Referring to FIG. 1, the lens assembly 1 includes a lens unit, a first reflective element P11, and an optical filter OF1. The lens unit and the first reflective element P11 are arranged in order from an object side along a first axis AX11. The lens unit includes a stop ST1, a first lens L11, and a second lens L12. The stop ST1, the first lens L11, and the second lens L12 are arranged in order from the object side along the first axis AX11. The optical filter OF1 is disposed between an image plane IMA1 and the first reflective element P11, so that the image plane IMA1, the optical filter OF1, and the first reflective element P11 are arranged in order from an image side along a second axis AX12. The first reflective element P11 includes a first surface S16, a first prism surface S17, a bottom surface S18, and a second prism surface S19. Both sides of the first surface S16 are connected to one side of the first prism surface S17 and one side of the second prism surface S19, respectively. Both sides of the bottom surface S18 are connected to another side of the first prism surface S17 and another side of the second prism surface S19, respectively. The first surface S16 is opposite to the bottom surface S18. The angle value β1 of the included angle between the first surface S16 and the first prism surface S17 is equal to 34 degrees. The angle value β2 of the included angle between the first surface S16 and the second prism surface S19 is equal to 34 degrees. The present invention is not limited thereto. In the first embodiment, β1 and β2 can be respectively in the numerical range of 34±5 degrees, that is, 29 degrees to 39 degrees. In operation, a light from the object side passing through the first lens L11 and the second lens L12, and then entering the first reflective element P11 from the first surface S16, then guided to the first prism surface S17, then reflected by the first prism surface S17 and guided to the first surface S16, then reflected by the first surface S16 and guided to the second prism surface S19, then reflected by the second prism surface S19 and guided to the first surface S16, then exiting the first reflective element P11 from the first surface S16, finally imaged on an image plane IMA1. The light is reflected three times inside the first reflective element P11. According to the foregoing, wherein: the first lens L11 is a meniscus lens, wherein the image side surface S13 is a concave surface; and both of the object side surface S110 and image side surface S111 of the optical filter OF1 are plane surfaces.

With the above design of the lenses, stop ST1, first reflective element P11, and at least one of the conditions (1)-(11) satisfied, the lens assembly 1 can have an effective shortened total lens length, an effective decreased volume, an effective increased resolution, an effective corrected aberration, and an effective corrected chromatic aberration.

It should be noted that the first reflective element P11 is not limited to the embodiment shown in FIG. 1, the other suitable structures can also be adopted. For example, but not limited to, the first reflective element P11 can adopt the same structure as the first reflective element P21 shown in FIG. 5 of the second embodiment, the same structure as the first reflective element P31 shown in FIG. 9 of the third embodiment, or the same structure as the first reflective element P41 shown in FIG. 13 of the fourth embodiment assembly.

Table 1 shows the optical specification of the lens assembly 1 in FIG. 1. The preferred embodiment of the present invention can be achieved when the lens assembly meets the refractive power distribution and surface shape in Table 1, and satisfies conditions (1)-(11).

TABLE 1

Effective Focal Length = 16.6 mm F-number = 2.8
Total Lens Length = 19.576 mm Field of View = 16.7 degrees

| Surface Number | Radius of Curvature (mm) | Thickness (mm) | Nd | Vd | Effective Focal Length (mm) | Remark |
|---|---|---|---|---|---|---|
| S11 | ∞ | −0.93132 | | | | ST1 |
| S12 | 4.676986 | 1.12 | 1.849 | 40.19 | 6.961 | L11 |
| S13 | 19.60943 | 0.08529424 | | | | |
| S14 | 2.914733 | 0.48 | 1.996 | 19.43 | −8.717 | L12 |
| S15 | 2.006621 | 1.37 | | | | |
| S16 | ∞ | 1.95 | 1.571 | 53 | | P11 |
| S17 | ∞ | 5.2055 | 1.571 | 53 | | P11 |

TABLE 1-continued

Effective Focal Length = 16.6 mm F-number = 2.8
Total Lens Length = 19.576 mm Field of View = 16.7 degrees

| Surface Number | Radius of Curvature (mm) | Thickness (mm) | Nd | Vd | Effective Focal Length (mm) | Remark |
|---|---|---|---|---|---|---|
| S16 | ∞ | 4.66 | 1.571 | 53 | | P11 |
| S19 | ∞ | 1.746 | 1.571 | 53 | | P11 |
| S16 | ∞ | 1.99 | | | | |
| S110 | ∞ | 0.21 | 1.5168 | 64.167 | | OF1 |
| S111 | ∞ | 0.68 | | | | |

The aspheric surface sag z of each aspheric lens in table 1 can be calculated by the following formula:

$$z = ch^2/\{1 + [1 - (k-1)c^2h^2]^{1/2}\} + Ah^2 + Bh^4 + Ch^6 + Dh^8 + Eh^{10} + Fh^{12} + Gh^{14}$$

where c is curvature, h is the vertical distance from the lens surface to the axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A | B | C | D | E | F | G |
|---|---|---|---|---|---|---|---|---|
| S12 | 0.01 | 1.04E−03 | −2.62E−04 | −1.98E−06 | −1.29E−06 | 4.48E−07 | −3.87E−08 | 1.02E−09 |
| S13 | −115.12 | 8.93E−04 | −4.74E−04 | 6.57E−05 | −4.12E−07 | −6.56E−07 | 6.41E−08 | −2.43E−09 |
| S14 | 0.04 | −2.05E−02 | 1.01E−03 | 5.92E−05 | −1.42E−05 | 7.52E−07 | 6.05E−08 | −3.03E−08 |
| S15 | −1.13 | −1.32E−02 | 3.14E−03 | −3.81E−04 | 8.19E−05 | 7.68E−07 | −7.87E−07 | −1.19E−07 |

Table 3 shows the parameters and condition values for conditions (1)-(11) in accordance with the first embodiment of the invention. It can be seen from Table 3 that the lens assembly 1 of the first embodiment satisfies the conditions (1)-(11).

TABLE 3

| | | | | | |
|---|---|---|---|---|---|
| Dm1 | 5.64 mm | β1 | 34 degrees | A | 14.502 mm |
| B | 3.055 mm | C | 2.88 mm | D | 3.095 mm |
| E | 5.975 mm | F | 6.15 mm | T1 | 1.12 mm |
| Dm1/f | 0.34 | 1/tanβ | 1.48 | B/A | 0.21 |
| D/A | 0.21 | C/B | 0.94 | F/E | 1.03 |
| f1/f | 0.42 | R11/R21 | 1.60 | f1/Dm1 | 1.23 |
| f/T1 | 14.82 | G | 0.89 mm | G/D | 0.29 |

Figure 2:
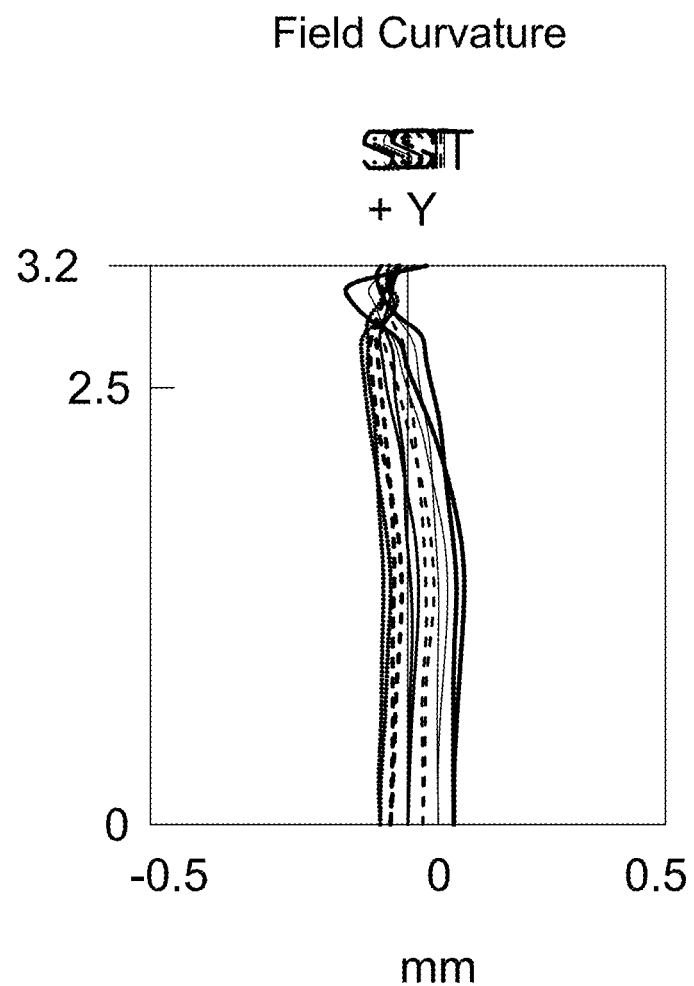
FIG. 2, FIG. 3, and FIG. 4 depict a field curvature diagram, a distortion diagram, and a modulation transfer function diagram of the lens assembly in accordance with the first embodiment of the invention.
Figure 3:
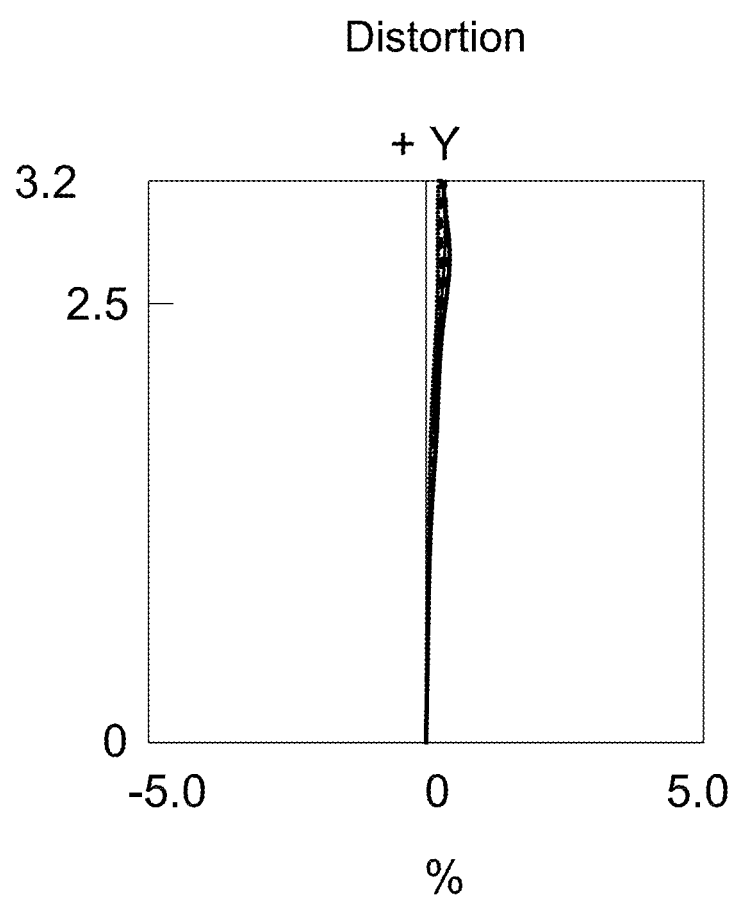
Figure 4:
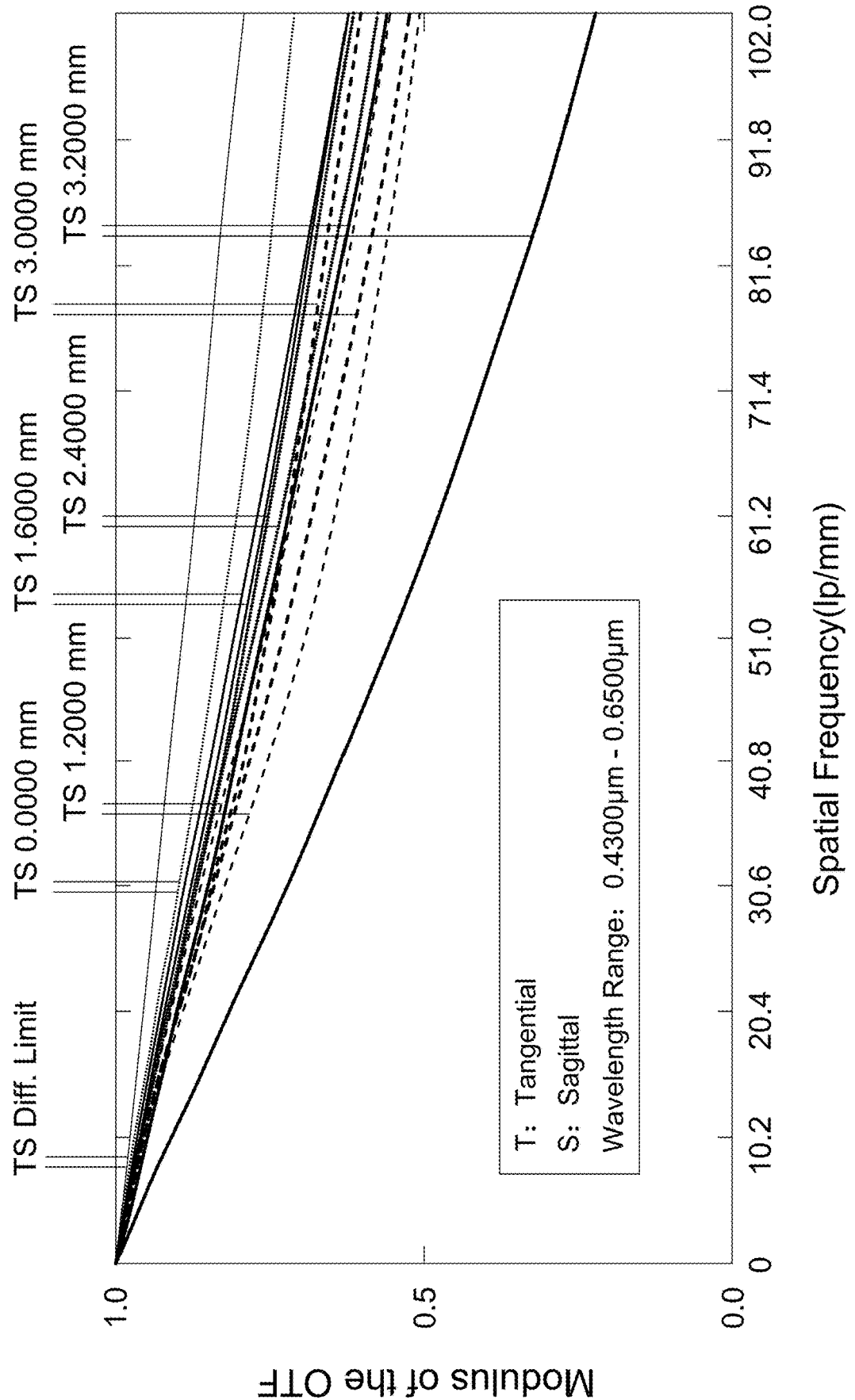

In addition, the lens assembly 1 of the first embodiment can meet the requirements of optical performance as seen in FIGS. 2-4. It can be seen from FIG. 2 that the field curvature of tangential direction and sagittal direction in the lens assembly 1 of the first embodiment ranges from −0.15 mm to 0.15 mm. It can be seen from FIG. 3 that the distortion in the lens assembly 1 of the first embodiment ranges from 0% to 0.5%. It can be seen from FIG. 4 that the modulation transfer function of tangential direction and sagittal direction in the lens assembly 1 of the first embodiment ranges from 0.26 to 1.0. It is obvious that the field curvature and the distortion of the lens assembly 1 of the first embodiment can be corrected effectively, the image resolution can meet the requirements. Therefore, the lens assembly 1 of the first embodiment is capable of good optical performance.

A detailed description of a lens assembly in accordance with a second embodiment of the invention is as follows. Referring to FIG. 5, the lens assembly 2 includes a lens unit, a first reflective element P21, and an optical filter OF2. The lens unit and the first reflective element P21 are arranged in order from an object side along a first axis AX21. The lens unit includes a first lens L21, a stop ST2, a third lens L23, and a second lens L22. The first lens L21, the stop ST2, the third lens L23, and the second lens L22 are arranged in order from the object side along the first axis AX21. The optical filter OF2 is disposed between an image plane IMA2 and the first reflective element P21, so that the image plane IMA2, the optical filter OF2, and the first reflective element P21 are arranged in order from an image side along a second axis AX22. The first reflective element P21 includes a first surface S28, a first prism surface S29, a bottom surface S210, and a second prism surface S211. Both sides of the first surface S28 are connected to one side of the first prism surface S29 and one side of the second prism surface S211, respectively. Both sides of the bottom surface S210 are connected to another side of the first prism surface S29 and another side of the second prism surface S211, respectively. The first surface S28 is opposite to the bottom surface S210. The angle value β1 of the included angle between the first surface S28 and the first prism surface S29 is equal to 37 degrees. The angle value β2 of the included angle between the first surface S28 and the second prism surface S211 is equal to 37 degrees. The present invention is not limited thereto. In the second embodiment, β1 and β2 can be respectively in the numerical range of 37±5 degrees, that is, 32 degrees to 42 degrees. In operation, a light from the object side passing through the first lens L21, the third lens L23, and the second lens L22, and then entering the first reflective element P21 from the first surface S28 and guided to the first prism surface S29, then reflected by the first prism surface S29 and guided to the first surface S28, then reflected by the first surface S28 and guided to the second prism surface S211, then reflected by the second prism surface S211 and guided to the first surface S28, then exiting the first reflective element P21 from the first surface S28, finally imaged on an image plane IMA2. The light is reflected three times inside the first reflective element P21. According to the foregoing, wherein: the first lens L21 is a biconvex lens, wherein the image side surface S22 is a convex surface; the third lens L23 is a meniscus lens with positive refractive power and made of glass material, wherein the object side surface S24 is a convex surface, the image side surface S25 is a concave surface, and both of the object side surface S24 and image side surface S25 are aspheric surfaces; and both of the object side surface S212 and image side surface S213 of the optical filter OF2 are plane surfaces.

With the above design of the lenses, stop ST2, first reflective element P21, and at least one of the conditions (1)-(11) satisfied, the lens assembly 2 can have an effective shortened total lens length, an effective decreased volume, an effective increased resolution, an effective corrected aberration, and an effective corrected chromatic aberration.

It should be noted that the first reflective element P21 is not limited to the embodiment shown in FIG. 5, the other suitable structures can also be adopted. For example, but not limited to, the first reflective element P21 can adopt the same structure as the first reflective element P11 shown in FIG. 1 of the first embodiment, the same structure as the first reflective element P31 shown in FIG. 9 of the third embodiment, or the same structure as the first reflective element P41 shown in FIG. 13 of the fourth embodiment assembly.

Table 4 shows the optical specification of the lens assembly 2 in FIG. 5. The preferred embodiment of the present invention can be achieved when the lens assembly meets the refractive power distribution and surface shape in Table 4, and satisfies conditions (1)-(11).

TABLE 4

Effective Focal Length = 11.78 mm F-number = 2.8
Total Lens Length = 14.8983 mm Field of View = 11.86 degrees

| Surface Number | Radius of Curvature (mm) | Thickness (mm) | Nd | Vd | Effective Focal Length (mm) | Remark |
|---|---|---|---|---|---|---|
| S21 | 3.925713 | 1.2 | 1.5352 | 56.115 | 5.708 | L21 |
| S22 | −12.3034 | 0.32 | | | | |
| S23 | ∞ | −0.25 | | | | ST2 |
| S24 | 3.852117 | 0.4103205 | 1.6713 | 19.243 | 21.239 | L23 |
| S25 | 5.052246 | 0.12 | | | | |
| S26 | 2.583573 | 0.3 | 1.6713 | 19.243 | −4.933 | L22 |
| S27 | 1.383666 | 0.9 | | | | |
| S28 | ∞ | 1.223 | 1.6581 | 50.9 | | P21 |
| S29 | ∞ | 4.44 | 1.6581 | 50.9 | | P21 |
| S28 | ∞ | 4.17 | 1.6581 | 50.9 | | P21 |
| S211 | ∞ | 1.147 | 1.6581 | 50.9 | | P21 |
| S28 | ∞ | 0.3 | | | | |
| S212 | ∞ | 0.21 | 1.5168 | 64.167 | | OF2 |
| S213 | ∞ | 0.388 | | | | |

The definition of aspheric surface sag z of each aspheric lens in table 4 is the same as that of in Table 1, and is not described here again. In the second embodiment, the conic constant k and the aspheric coefficients A, B, C, D, E, F, G of each aspheric lens are shown in Table 5.

TABLE 5

| Surface Number | k | A | B | C | D | E | F | G |
|---|---|---|---|---|---|---|---|---|
| S21 | −0.29 | −3.82E−04 | 1.35E−04 | −1.21E−05 | 1.10E−08 | 7.57E−08 | −3.78E−09 | −2.22E−10 |
| S22 | −202.81 | 1.01E−03 | 3.48E−06 | −1.51E−05 | −8.72E−07 | 1.02E−07 | 2.77E−08 | −2.50E−09 |
| S24 | 1.86 | 2.85E−03 | −5.24E−05 | −3.26E−05 | 4.97E−06 | −1.41E−06 | 9.02E−08 | 4.45E−09 |
| S25 | −8.88 | 1.07E−02 | −2.11E−03 | 3.77E−04 | −1.28E−05 | 1.43E−06 | 1.57E−06 | −3.89E−07 |
| S26 | −1.45 | −6.49E−03 | −1.38E−03 | 5.42E−04 | 3.90E−05 | −1.64E−05 | 1.64E−06 | −2.62E−07 |
| S27 | −0.97 | −1.61E−02 | 1.48E−03 | 4.35E−04 | −3.67E−05 | −6.19E−06 | −3.05E−06 | 4.54E−07 |

Table 6 shows the parameters and condition values for conditions (1)-(11) in accordance with the second embodiment of the invention. It can be seen from Table 6 that the lens assembly 2 of the second embodiment satisfies the conditions (1)-(11).

TABLE 6

| Dm1 | 4.111 mm | β1 | 37 degrees | A | 11.852 mm |
|---|---|---|---|---|---|
| B | 3 mm | C | 0.898 mm | D | 2.332 mm |
| E | 3.230 mm | F | 5.332 mm | T1 | 1.2 mm |
| Dm1/f | 0.35 | 1/tanβ | 1.33 | B/A | 0.30 |
| D/A | 0.20 | C/B | 0.25 | F/E | 1.84 |
| f1/f | 0.48 | R11/R21 | 1.52 | f1/Dm1 | 1.39 |
| f/T1 | 9.82 | G | 0.96 mm | G/D | 0.41 |

Figure 6:
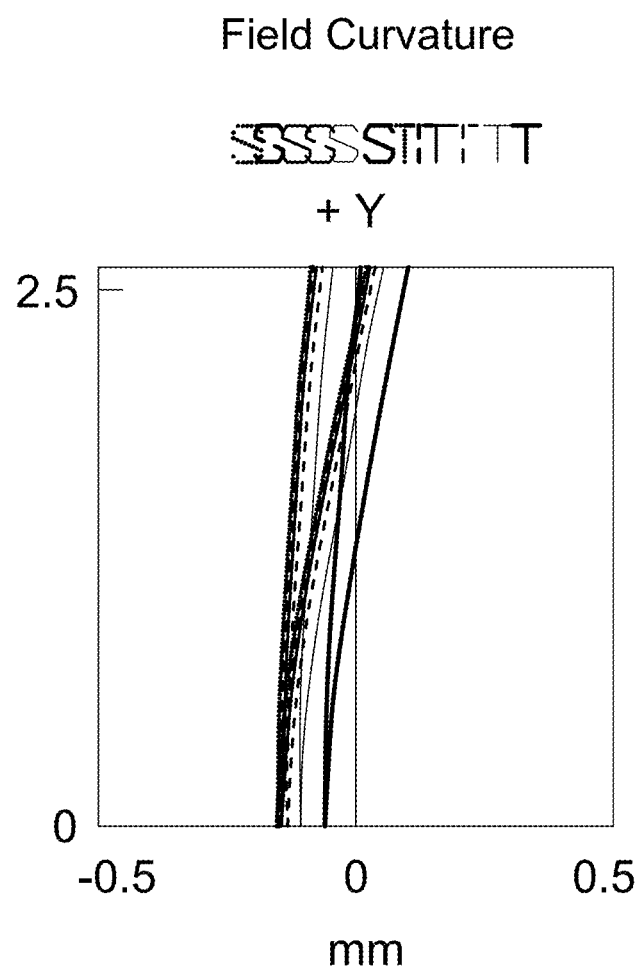
FIG. 6, FIG. 7, and FIG. 8 depict a field curvature diagram, a distortion diagram, and a modulation transfer function diagram of the lens assembly in accordance with the second embodiment of the invention.
Figure 7:
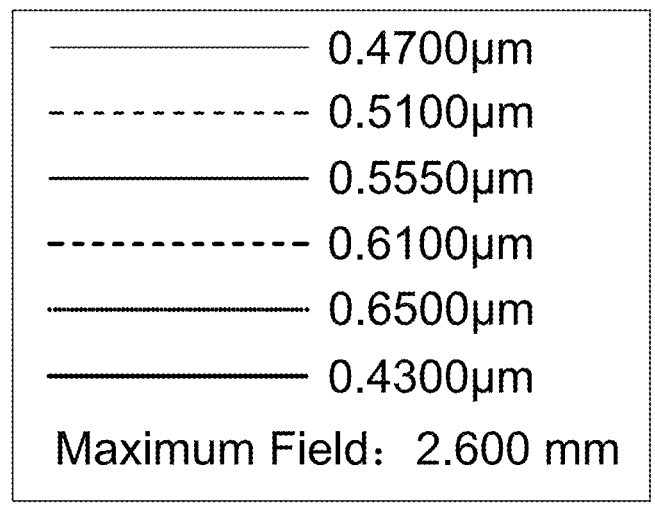
Figure 7:
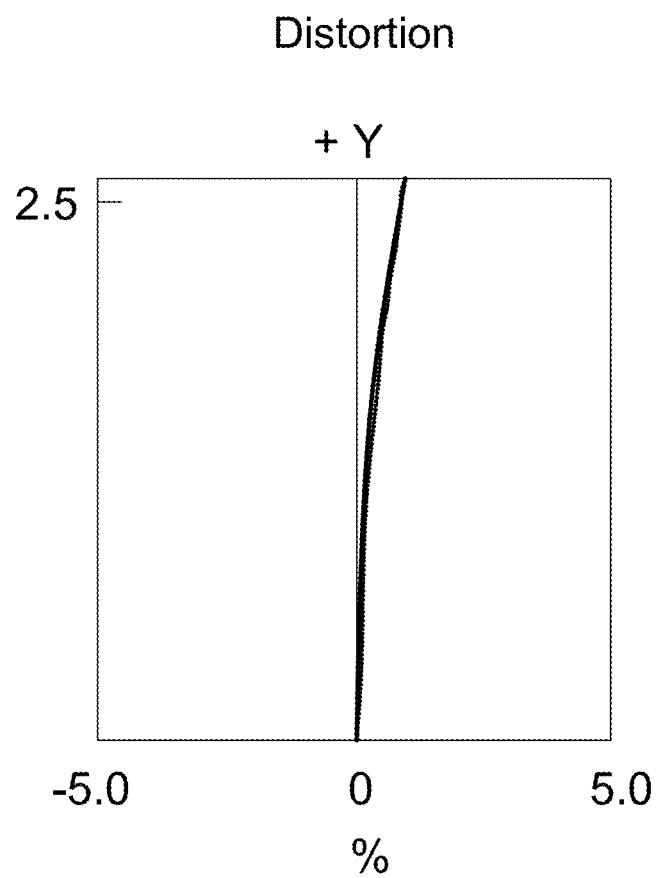
Figure 8:
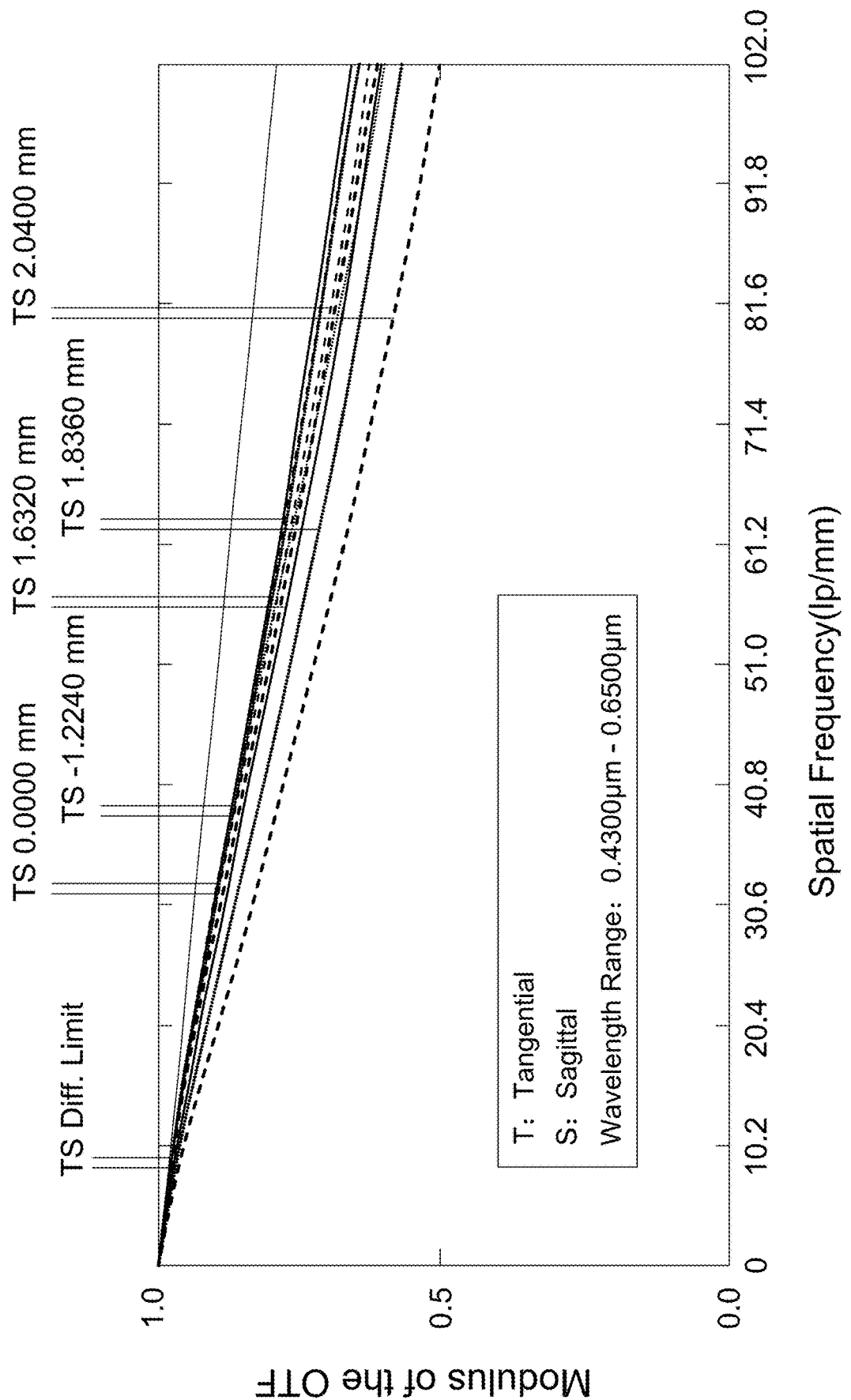

In addition, the lens assembly 2 of the second embodiment can meet the requirements of optical performance as seen in FIGS. 6-8. It can be seen from FIG. 6 that the field curvature of tangential direction and sagittal direction in the lens assembly 2 of the second embodiment ranges from −0.2 mm to 0.15 mm. It can be seen from FIG. 7 that the distortion in the lens assembly 2 of the second embodiment ranges from 0% to 1%. It can be seen from FIG. 8 that the modulation transfer function of tangential direction and sagittal direction in the lens assembly 2 of the second embodiment ranges from 0.2 to 1.0. It is obvious that the field curvature and the distortion of the lens assembly 2 of the second embodiment can be corrected effectively, the image resolution can meet the requirements. Therefore, the lens assembly 2 of the second embodiment is capable of good optical performance.

A detailed description of a lens assembly in accordance with a third embodiment of the invention is as follows. Referring to FIG. 9, the lens assembly 3 includes a lens unit, a first reflective element P31, and an optical filter OF3. The lens unit and the first reflective element P31 are arranged in order from an object side along a first axis AX31. The lens unit includes a first lens L31, a stop ST3, a second lens L32, and a third lens L33. The first lens L31, the stop ST3, the second lens L32, and the third lens L33 are arranged in order from the object side along the first axis AX31. The optical filter OF3 is disposed between an image plane IMA3 and the first reflective element P31, so that the image plane IMA3, the optical filter OF3, and the first reflective element P31 are arranged in order from an image side along a second axis AX32. The first reflective element P31 includes a first surface S38, a first prism surface S39, a bottom surface S310, and a second prism surface S311. Both sides of the first surface S38 are connected to one side of the first prism surface S39 and one side of the second prism surface S311, respectively. Both sides of the bottom surface S310 are connected to another side of the first prism surface S39 and another side of the second prism surface S311, respectively. The first surface S38 is opposite to the bottom surface S310. The angle value β1 of the included angle between the first surface S38 and the first prism surface S39 is equal to 35 degrees. The angle value β2 of the included angle between the first surface S38 and the second prism surface S311 is equal to 35 degrees. The present invention is not limited thereto. In the third embodiment, β1 and β2 can be respectively in the numerical range of 35±5 degrees, that is, 30 degrees to 40 degrees. In operation, a light from the object side passing through the first lens L31, the second lens L32, and the third lens L33, and then entering the first reflective element P31 from the first surface S38 and guided to the first prism surface S39, then reflected by the first prism surface S39 and guided to the first surface S38, then reflected by the first surface S38 and guided to the second prism surface S311, then reflected by the second prism surface S311 and guided to the first surface S38, then exiting the first reflective element P31 from the first surface S38, finally imaged on an image plane IMA3. The light is reflected three times inside the first reflective element P31. According to the foregoing, wherein: the first lens L31 is a meniscus lens, wherein the image side surface S32 is a concave surface; the third lens L33 is a biconvex lens with positive refractive power and made of glass material, wherein the object side surface S36 is a convex surface, the image side surface S37 is a convex surface, and both of the object side surface S36 and image side surface S37 are aspheric surfaces; and both of the object side surface S312 and image side surface S313 of the optical filter OF3 are plane surfaces.

With the above design of the lenses, stop ST3, first reflective element P31, and at least one of the conditions (1)-(11) satisfied, the lens assembly 3 can have an effective shortened total lens length, an effective decreased volume, an effective increased resolution, an effective corrected aberration, and an effective corrected chromatic aberration.

It should be noted that the first reflective element P31 is not limited to the embodiment shown in FIG. 9, the other suitable structures can also be adopted. For example, but not limited to, the first reflective element P31 can adopt the same structure as the first reflective element P11 shown in FIG. 1 of the first embodiment, the same structure as the first reflective element P21 shown in FIG. 5 of the second embodiment, or the same structure as the first reflective element P41 shown in FIG. 13 of the fourth embodiment assembly.

Table 7 shows the optical specification of the lens assembly 3 in FIG. 9. The preferred embodiment of the present invention can be achieved when the lens assembly meets the refractive power distribution and surface shape in Table 7, and satisfies conditions (1)-(11).

TABLE 7

Effective Focal Length = 14.08 mm F-number = 2.2
Total Lens Length = 22.7648 mm Field of View = 15.85 degrees

| Surface Number | Radius of Curvature (mm) | Thickness (mm) | Nd | Vd | Effective Focal Length (mm) | Remark |
|---|---|---|---|---|---|---|
| S31 | 6.263005 | 0.8649555 | 2.0018 | 19.32 | 7.901 | L31 |
| S32 | 27.92483 | 0.2500512 | | | | |
| S33 | ∞ | 0.2236833 | | | | ST3 |

TABLE 7-continued

Effective Focal Length = 14.08 mm F-number = 2.2
Total Lens Length = 22.7648 mm Field of View = 15.85 degrees

| Surface Number | Radius of Curvature (mm) | Thickness (mm) | Nd | Vd | Effective Focal Length (mm) | Remark |
|---|---|---|---|---|---|---|
| S34 | 12.60895 | 0.3478296 | 1.6713 | 19.243 | −5.234 | L32 |
| S35 | 2.717708 | 0.6409019 | | | | |
| S36 | 7.463666 | 0.8526358 | 1.8656 | 48.548 | 8.231 | L33 |
| S37 | −148.43 | 0.2 | | | | |
| S38 | ∞ | 2.223 | 1.74 | 50.006 | | P31 |
| S39 | ∞ | 6.507 | | | | P31 |
| S38 | ∞ | 7.483 | | | | P31 |
| S311 | ∞ | 2.562 | | | | P31 |
| S38 | ∞ | 0.3 | | | | |
| S312 | ∞ | 0.21 | 1.5168 | 64.167 | | OF3 |
| S313 | ∞ | 0.28 | | | | |

The definition of aspheric surface sag z of each aspheric lens in table 7 is the same as that of in Table 1, and is not described here again. In the third embodiment, the conic constant k and the aspheric coefficients A, B, C, D, E, F, G of each aspheric lens are shown in Table 8.

TABLE 8

| Surface Number | k | A | B | C | D | E | F | G |
|---|---|---|---|---|---|---|---|---|
| S31 | −0.408 | −1.63E−03 | 1.39E−05 | −8.76E−07 | 2.12E−07 | 4.81E−09 | −1.49E−08 | 1.15E−09 |
| S32 | −22.066 | −2.68E−05 | 6.31E−06 | 8.69E−06 | −1.49E−06 | 1.02E−08 | 1.42E−11 | 7.05E−10 |
| S34 | 12.909 | −3.29E−03 | 2.77E−05 | 1.22E−05 | −1.72E−06 | 1.87E−07 | 1.70E−08 | −1.34E−09 |
| S35 | −0.122 | −6.40E−03 | −0.000706861 | −5.77E−05 | 4.66E−07 | 2.75E−07 | 9.10E−08 | −1.96E−08 |
| S36 | 5.230 | 2.67E−03 | −0.000202793 | 2.76E−07 | −6.01E−06 | 3.89E−08 | 6.85E−08 | −1.55E−08 |
| S37 | 376.772 | 1.80E−03 | 0.000191416 | −1.93E−05 | 4.12E−06 | 3.47E−07 | −2.53E−07 | 1.19E−08 |

Table 9 shows the parameters and condition values for conditions (1)-(11) in accordance with the third embodiment of the invention. It can be seen from Table 9 that the lens assembly 3 of the third embodiment satisfies the conditions (1)-(11).

TABLE 9

| | | | | | |
|---|---|---|---|---|---|
| Dm1 | 6.2663 mm | β1 | 35 degrees | A | 18.492 mm |
| B | 3.38 mm | C | 0.790 mm | D | 4.134 mm |
| E | 4.924 mm | F | 7.514 mm | T1 | 0.87 mm |
| Dm1/f | 0.45 | 1/tanβ | 1.43 | B/A | 0.18 |
| D/A | 0.22 | C/B | 0.23 | F/E | 1.53 |
| f1/f | 0.56 | R11/R21 | 0.50 | f1/Dm1 | 1.26 |
| f/T1 | 16.28 | G | 1.65 mm | G/D | 0.40 |

Figure 10:
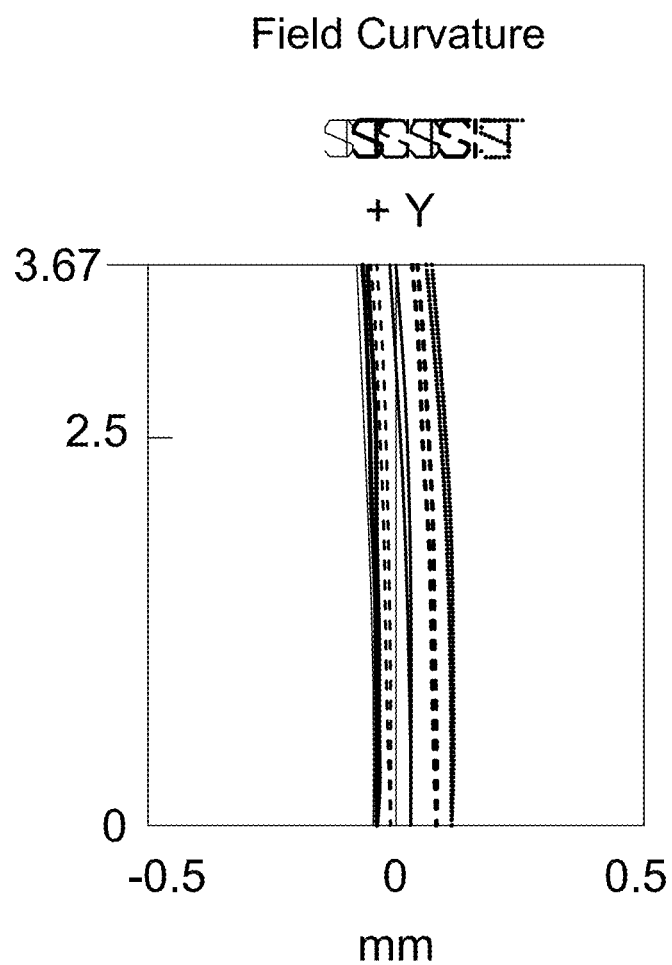
FIG. 10, FIG. 11, and FIG. 12 depict a field curvature diagram, a distortion diagram, and a modulation transfer function diagram of the lens assembly in accordance with the third embodiment of the invention.
Figure 11:
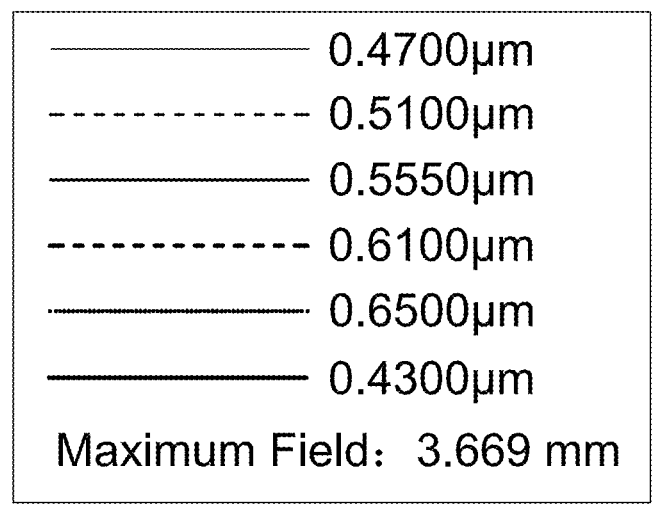
Figure 11:
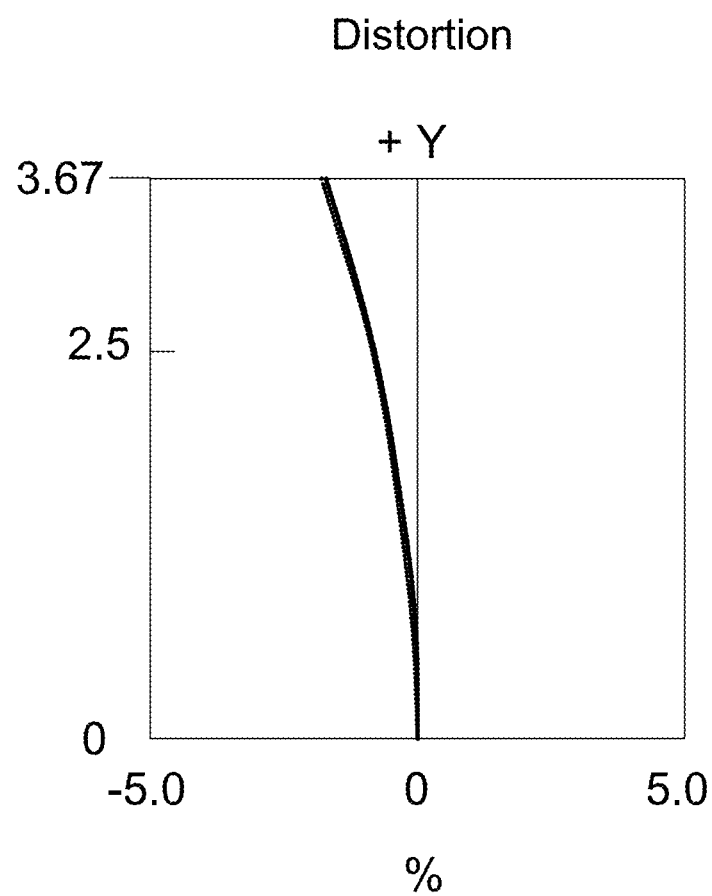
Figure 12:
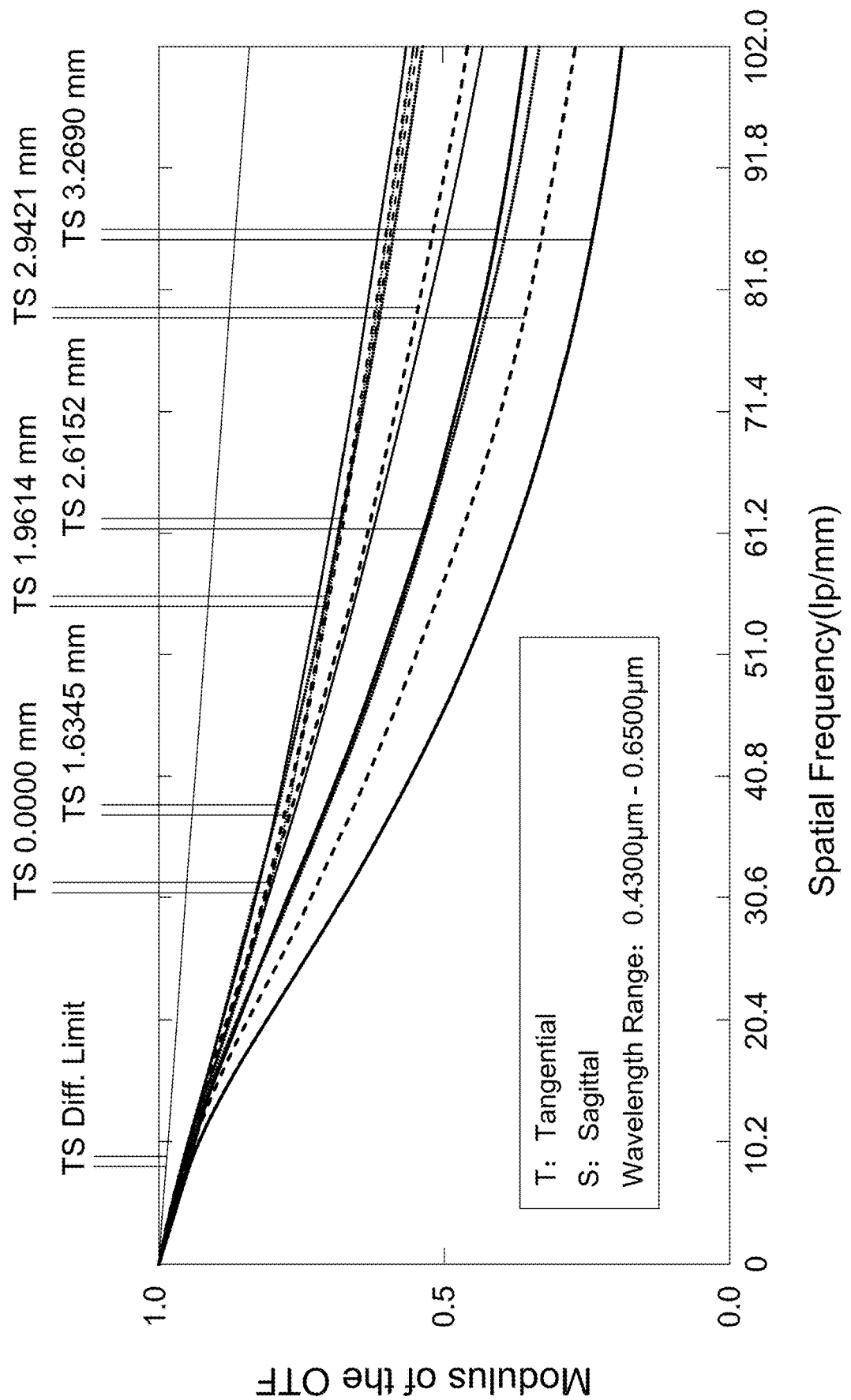

In addition, the lens assembly 3 of the third embodiment can meet the requirements of optical performance as seen in FIGS. 10-12. It can be seen from FIG. 10 that the field curvature of tangential direction and sagittal direction in the lens assembly 3 of the third embodiment ranges from −0.1 mm to 0.15 mm. It can be seen from FIG. 11 that the distortion in the lens assembly 3 of the third embodiment ranges from −2% to 0%. It can be seen from FIG. 12 that the modulation transfer function of tangential direction and sagittal direction in the lens assembly 3 of the third embodiment ranges from 0.1 to 1.0. It is obvious that the field curvature and the distortion of the lens assembly 3 of the third embodiment can be corrected effectively, the image resolution can meet the requirements. Therefore, the lens assembly 3 of the third embodiment is capable of good optical performance.

In the above embodiments, the first reflective elements P11, P21, and P31 can also be added with a groove structure, and the groove structure can be provided on the surface of the first surfaces S16, S28, S38 or the bottom surfaces S18, S210, S310 alone, or on the surface of the first surfaces S16, S28, S38 and the bottom surfaces S18, S210, S310 at the same time. The groove structure is formed by the V-shaped structure of the surface, and the groove structure can be used to block part of the edge light reflected from the inside, that is, by changing the shape of the area inside the first reflective element where the non-main light path passes, the depth of the groove structure can be set correspondingly according to the severity of ghost image, thereby effectively decreasing the occurrence of ghost image and completely blocking the edge light that causes ghost image, making the lens assembly having better image quality. In addition, a light-absorbing layer may also be provided on the surface of the groove structure, and the light-absorbing layer is coated with black light-shielding material or bonded a light-shielding element on the surface. The groove depth of the above groove structure may range from 0.8 mm to 1.7 mm. The figure shown by the thick dotted line in FIG. 5 is formed by adding the first reflective element P21, which originally does not have a groove structure, into the groove structure. The bottom surface S210 is provided with a groove, the depth of the groove is G, and the first surface S28 is provided with another groove, wherein the groove depth G in FIG. 5 is equal to 0.96 mm, so that G/D=0.96/2.332=0.41 satisfies the requirement of condition (11): 0.1<G/D<0.6.

In the above embodiments, the first reflective elements P11, P21, P31 are integrally formed, but the present invention is not limited thereto, and the first reflective elements P11, P21, and P31 can also be replaced by two reflective elements with different materials, and the groove structure can be provided on the surface of any one of the reflective elements or on the surface of the two reflective elements at the same time. The first reflective element P11 in the first embodiment can be replaced by two reflective elements with different materials, and both reflective elements have a groove structure. The fourth embodiment of the lens assembly of the present invention described below is to replace the first reflective element P11 of the first embodiment by two reflective elements with different materials.

Figure 13:
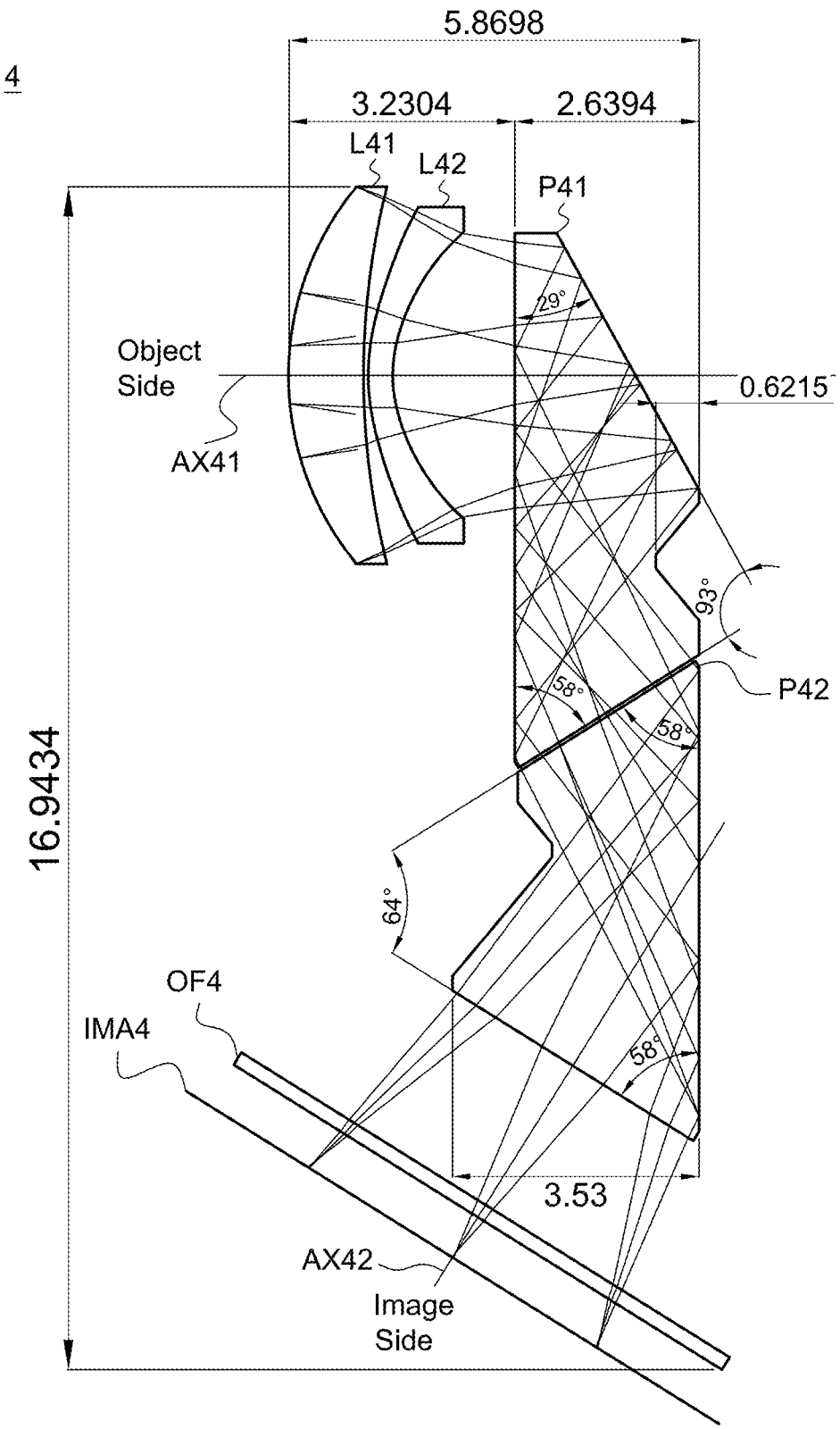
FIG. 13 is a lens layout and optical path diagram of a lens assembly in accordance with a fourth embodiment of the invention.

FIG. 13 is a lens layout and optical path diagram of a lens assembly in accordance with a fourth embodiment of the invention. The lens assembly 4 includes a lens unit, a first reflective element P41, a second reflective element P42, and an optical filter OF4. The lens unit and the first reflective element P41 are arranged in order from an object side along a first axis AX41. The lens unit includes a first lens L41 and a second lens LA2. The first lens LA1 and the second lens L42 are arranged in order from the object side along the first axis AX41. The optical filter OF4 is disposed between an image plane IMA4 and the second reflective element P42, and the second reflective element P42 is disposed between the optical filter OF4 and the first reflective element P41, so that the image plane IMA4, the optical filter OF4, and the second reflective element P42 are arranged in order from an image side along a second axis AX42. The second axis AX42 is not parallel to the first axis AX41. In operation, a light from an object side passing through the first lens L41 and the second lens L42, and then entering the first reflective element P41, then reflected twice inside the first reflective element P41, then exiting the first reflective element P41 and guided to the second reflective element P42, then reflected once inside the second reflective element P42, then exiting the second reflective element P42 and guided to the optical filter OF4, finally imaged on an image plane IMA4. The material of the first reflective element P41 is different to that of the second reflective element P42 and the shape and refractive index of the combination of the first reflective element P41 and the second reflective element P42 are different to that of the first reflective element P11 of the first embodiment, so that the image plane IMA4 of the lens assembly 4 is not perpendicular to the first axis AX41, that is, the first axis AX41 is not parallel to the second axis AX42, which is obviously different from that of the first embodiment wherein the image plane IMA1 is perpendicular to the first axis AX11 and the first axis AX11 is parallel to the second axis AX12. Both the first reflective element P41 and the second reflective element P42 have a groove structure, and the groove structure can effectively decrease ghost image, so that the lens assembly 4 has better image quality. The ghost image can be effectively decreased when the refractive index of the second reflective element P42 is greater than that of the first reflective element P41. The Abbe numbers of the first reflective element P41 and the second reflective element P42 can be between 19 and 100. In the lens assembly 4 of the fourth embodiment, the refractive index of the first reflective element P41 is equal to 1.517, the Abbe number is equal to 64.2, the refractive index of the second reflective element P42 is equal to 1.743, and the Abbe number is equal to 49.24, so that the lens assembly 4 satisfies the conditions (12): 1.4≤NdP1≤1.9; condition (13): 1.5≤NdP2≤2.0; condition (14): 0.1<| NdP1−NdP2|<0.5; wherein NdP1 is the refractive index of the first reflective element P41 and NdP2 is the refractive index of the second reflective element P42.

It should be noted that the first reflective element P41 is not limited to the embodiment shown in FIG. 13 the other suitable structures can also be adopted. For example, but not limited to, the first reflective element P41 can adopt the same structure as the first reflective element P11 shown in FIG. 1 of the first embodiment, the same structure as the first reflective element P21 shown in FIG. 5 of the second embodiment, or the same structure as the first reflective element P31 shown in FIG. 9 of the third embodiment assembly.

In the above third embodiment, the first reflective element P31 is integrally formed, but the present invention is not limited thereto, and the first reflective element P31 can also be replaced by two reflective elements with the same material, and one of the reflective elements has a groove structure, the other reflective element does not have a groove structure. The above two reflective elements with the same material are shown by the thick dotted line in FIG. 9, wherein the reflective element located above the figure has a groove structure, the reflective element located below the figure does not have a groove structure, and the groove structure can effectively decrease ghost image. The groove depth G in FIG. 9 is equal to 1.65 mm, so that G/D=1.65/4.134=0.40 satisfies the requirement of condition (11): 0.1<G/D<0.6.

Figure 14:
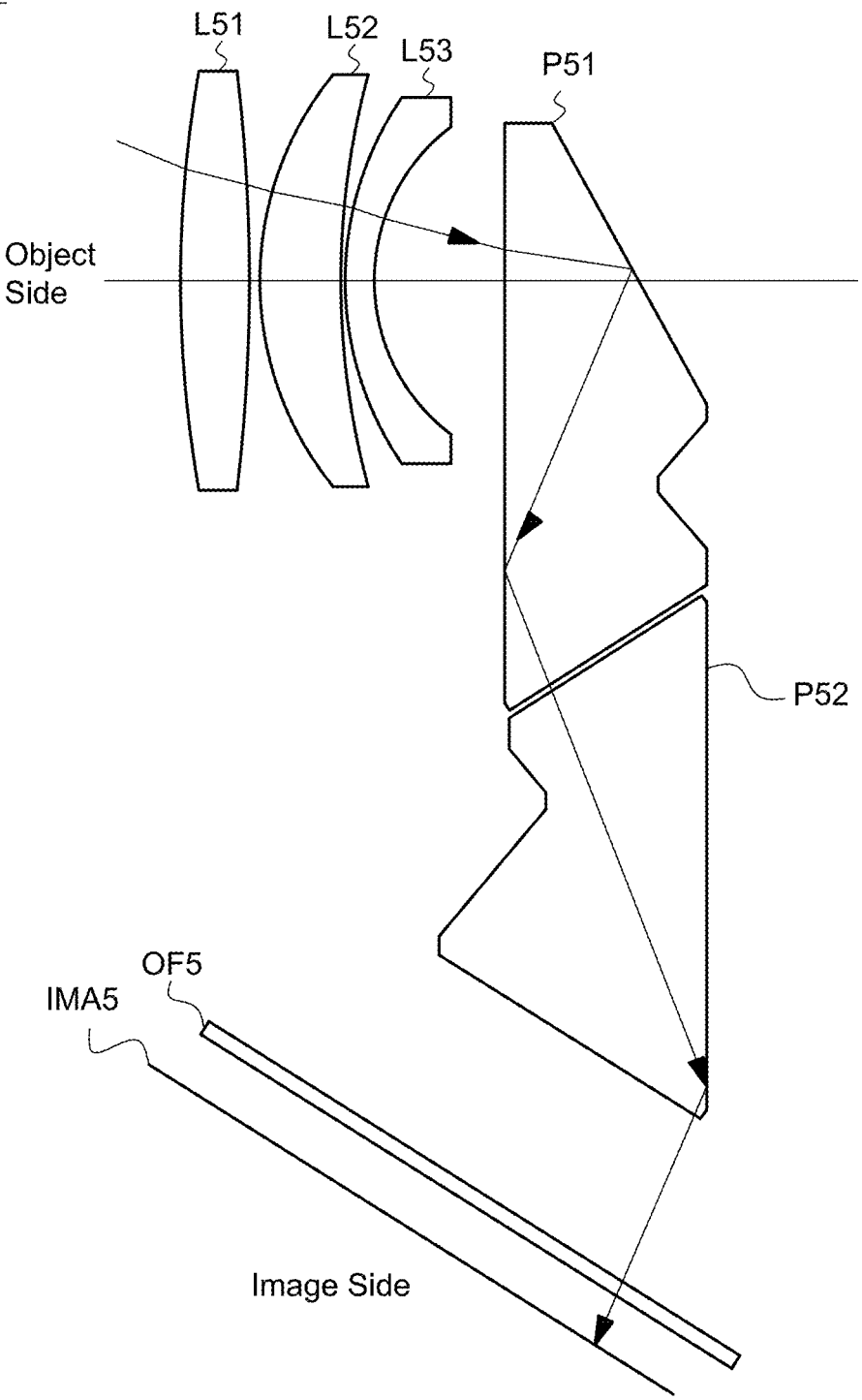
FIG. 14 is a lens layout and optical path diagram of a lens assembly in accordance with a fifth embodiment of the invention.

FIG. 14 is a lens layout and optical path diagram of a lens assembly in accordance with a fifth embodiment of the invention. In the fifth embodiment, the lens assembly 5 includes a lens unit and other parts, wherein the lens unit includes a first lens L51, a second lens L52, and a third lens L53, and the other parts are the same as those of in the above embodiments will not be described again. The present invention is not limited thereto, and the lens unit may also include other numbers of lenses, for example, four lenses, five lenses, or six lenses etc.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a lens unit; and
   a first reflective element;
   wherein the lens unit comprises a plurality of lenses and the back focal length of the lens unit is longer than the total length of the lens unit;
   wherein the first reflective element comprises a first surface, a first prism surface, and a bottom surface, and the first prism surface connects the first surface and the bottom surface, respectively;
   wherein the lens unit and the first reflective element are arranged in order from an object side along a first axis;
   wherein a light from the object side enters the first reflective element from the first surface and then is guided to the first prism surface;
   wherein the lens assembly satisfies at least one of following conditions:

$$0.2 < Dm1/f < 0.7;$$

$$1.0 < F/E < 3.0;$$

wherein Dm1 is an effective optical diameter of an image side surface of a lens and the lens is closest to the object side, f is an effective focal length of the lens assembly, F is a maximum interval from the object side surface of the lens to the bottom surface along the direction of the first axis, and E is a maximum interval from the bottom surface to the image plane along the direction of the second axis.

2. The lens assembly as claimed in claim 1, wherein:
the lens unit comprises a first lens with refractive power and a second lens with refractive power, wherein the first lens and the second lens are arranged in order from the object side along the first axis;
the first lens is with positive refractive power and comprises a convex surface facing the object side along the first axis; and
the second lens is a meniscus lens with negative refractive power and comprises a convex surface facing the object side along the first axis and a concave surface facing the first reflective element along the first axis.

3. The lens assembly as claimed in claim 2, wherein the first lens is a meniscus lens and further comprises a concave surface facing the first reflective element along the first axis.

4. The lens assembly as claimed in claim 2, wherein the first lens is a biconvex lens and further comprises a convex surface facing the first reflective element along the first axis.

5. A lens assembly comprising:
a lens unit; and
a first reflective element; wherein: the lens unit comprises a first lens, a second lens, and a third lens, and the back focal length of the lens unit is longer than the total length of the lens unit; the first lens is with refractive power; the second lens is with refractive power; the third lens is a meniscus lens with positive refractive power and comprises a convex surface facing an object side along a first axis and a concave surface facing the first reflective element along the first axis;
the first lens, the third lens, and the second lens are arranged in order from the object side along the first axis;
the first reflective element comprises a first surface, a first prism surface, and a bottom surface, and the first prism surface connects the first surface and the bottom surface, respectively;
the lens unit and the first reflective element are arranged in order from the object side along the first axis;
a light from the object side enters the first reflective element from the first surface and then is guided to the first prism surface;
the lens assembly satisfies at least one of following conditions:

$$0.2 < Dm1/f < 0.7;$$

$$0.5 < 1/\tan(\beta 1) < 2.5;$$

$$0.15 < B/A < 0.6;$$

$$0.15 < C/B < 1.0;$$

$$0.1 < D/A < 0.55;$$

$$1.0 < F/E < 3.0;$$

wherein Dm1 is an effective optical diameter of an image side surface of a lens and the lens is closest to the object side, f is an effective focal length of the lens assembly, $\beta 1$ is an angle value of the included angle between the first surface and the first prism surface, B is an interval from an object side surface of the lens to the first surface along the direction of the first axis, A is a maximum interval from a periphery of the effective optical diameter of the object side surface of the lens that is furthest away from an image plane to a periphery of the image plane that is furthest away from the lens along the direction perpendicular to the first axis, C is an interval from the first surface to the image plane along the direction of a second axis and the second axis is parallel to the first axis, D is a maximum interval from the first surface to the bottom surface along the direction of the first axis, F is a maximum interval from the object side surface of the lens to the bottom surface along the direction of the first axis, and E is a maximum interval from the bottom surface to the image plane along the direction of the second axis.

6. The lens assembly as claimed in claim 1, wherein:
the first reflective element further comprises a second prism surface; and
another angle value of the included angle between the first surface and the second prism surface is equal to the angle value of the included angle between the first surface and the first prism surface.

7. The lens assembly as claimed in claim 1, wherein:
the first reflective element further comprises a second prism surface; and
the first surface comprises two sides and the two sides connect to one side of the first prism surface and one side of the second prism surface, respectively.

8. The lens assembly as claimed in claim 7, wherein:
the bottom surface comprises two sides and the two sides connect to another side of the first prism surface and another side of the second prism surface, respectively.

9. The lens assembly as claimed in claim 8, wherein:
the first surface is opposite to the bottom surface.

10. The lens assembly as claimed in claim 1, wherein:
the angle value of the included angle between the first surface and the first prism surface is 29 degrees to 42 degrees; and
the lens assembly satisfies at least one of following conditions:

$$0.5 < 1/\tan(\beta 1) < 2.5;$$

$$0.15 < B/A < 0.6;$$

$$0.15 < C/B < 1.0;$$

$$0.1 < D/A < 0.55;$$

wherein $\beta 1$ is an angle value of the included angle between the first surface and the first prism surface, B is an interval from an object side surface of the lens to the first surface along the direction of the first axis, A is a maximum interval from a periphery of the effective optical diameter of the object side surface of the lens that is furthest away from an image plane to a periphery of the image plane that is furthest away from the lens along the direction perpendicular to the first axis, C is an interval from the first surface to the image plane along the direction of a second axis and the second axis is parallel to the first axis, and D is a maximum interval from the first surface to the bottom surface along the direction of the first axis.

11. The lens assembly as claimed in claim 1, wherein the light is reflected at least three times inside the first reflective element before exiting the first reflective element.

12. The lens assembly as claimed in claim 6, wherein the light enters the first prism surface and is reflected to the first surface, the first surface reflects the light and then enters the second prism surface, the second prism surface reflects the light and then enters the first surface, and the light exits the first reflective element from the first surface.

13. The lens assembly as claimed in claim 2, wherein the bottom surface or the first surface further comprises a groove.

14. The lens assembly as claimed in claim 13, wherein the lens assembly satisfies following condition:

$$0.1 < G/D < 0.6;$$

wherein G is a groove depth of the groove and D is a maximum interval from the first surface to the bottom surface along the direction of the first axis.

15. The lens assembly as claimed in claim 2, wherein the bottom surface further comprises a groove and the lens assembly satisfies at least one of following condition:

$$0 < f1/f < 2;$$
$$0.15 < R11/R21 < 3.5;$$
$$0.6 < f1/Dm1 < 2.8;$$
$$5 < f/T1 < 20;$$

wherein f1 is an effective focal length of the first lens, f is the effective focal length of the lens assembly, R11 is a radius of curvature of an object side surface of the first lens, R21 is a radius of curvature of an object side surface of the second lens, Dm1 is the effective optical diameter of the image side surface of the lens and the lens is closest to the object side, and T1 is an interval from the object side surface of the first lens to an image side surface of the first lens along the direction of the first axis.

16. The lens assembly as claimed in claim 1, further comprising a second reflective element disposed between the first reflective element and the image plane, wherein the material of the first reflective element is different to that of the second reflective element.

17. The lens assembly as claimed in claim 16, wherein the light enters the first prism surface and is reflected twice inside the first reflective element, then exiting the first reflective element and guided to the second reflective element, then reflected once inside the second reflective element and exiting the second reflective element.

18. The lens assembly as claimed in claim 16, wherein the lens assembly satisfies at least one of following conditions:

$$1.4 \le NdP1 \le 1.9;$$
$$1.5 \le NdP2 \le 2.0;$$
$$0.1 < |NdP1 - NdP2| < 0.5;$$

wherein NdP1 is a refractive index of the first reflective element and NdP2 is a refractive index of the second reflective element.

19. The lens assembly as claimed in claim 1, wherein the first reflective element is integrally formed, or the first reflective element are formed by two reflective elements with the same material, or the first reflective element can also be replaced by two reflective elements with different material.

* * * * *